Aug. 8, 1961 L. MINTZER 2,995,732

SHIFT REGISTER WITH IMPEDANCE LOADING WITHIN THE TRANSFER LOOP

Filed Feb. 7, 1958 2 Sheets-Sheet 1

INVENTOR.
LESTER MINTZER
BY Henry L. Hanson
ATTORNEY

SIGNAL INPUT

SHIFT INPUT

INVENTOR.
LESTER MINTZER
BY Henry L. Hanson
ATTORNEY

2,995,732

SHIFT REGISTER WITH IMPEDANCE LOADING WITHIN THE TRANSFER LOOP

Lester Mintzer, Newton Center, Mass., assignor to Minneapolis-Honeywell Regulator Company, Minneapolis, Minn., a corporation of Delaware Filed Feb. 7, 1958, Ser. No. 713,870
10 Claims. (Cl. 340—174)

A general object of the present invention is to provide a new and improved apparatus for manipulating and handling electrical pulse signals. More specifically, the present invention is concerned with an electrical shift register circuit and logical circuit element which is characterized by its ability to manipulate electrical pulse signals.

In electrical and electronic data processing equipment, information is conveniently handled in the form of electrical pulses which may be time spaced or otherwise displaced to represent desired information in coded form. In electronic data processing circuits, it is frequently required that information be moved from one point to another so that the information may be manipulated or compared in connection with some data processing program. Further, it is frequently desired that certain logical functions be performed in accordance with the type of signals that may be available in the data processing circuits.

Magnetic core devices have been found to be particularly adapted for use in data processing circuits for the reason that selected types of magnetic cores have bistable characteristics due to their having hysteresis characteristics which are rectangular in shape. Typical circuitry utilizing magnetic core devices for performing data transfer or shifting functions as well as logical functions will be found in an article by Guterman, et al. entitled "Logical and Control Functions Performed With Magnetic Cores," in the Proceedings of the I.R.E., volume 43, Number 3, March 1955, pages 291–298. As explained and discussed in this article, signals may be shifted from one magnetic core to the next through a suitable delay circuit in accordance with signals that may have set the cores prior to the application of shift pulses thereto. The shifting is controlled by shift current signals which are applied to the magnetic cores of the circuit.

In shift register circuits and core logical circuits heretofore used, the circuits have dissipated excessive power or energy in the delay links which couple the respective cores. This has required that these circuits have relatively large power signal supply and shifting circuits which are expensive to build, operate, and maintain. Further, circuits of this type have not had the degree of isolation between inputs and outputs that is desired for optimum logical circuits. When the devices heretofore known have been used as logical elements special winding combinations on the cores and additional isolating diodes have been required such that the fabrication of such circuits becomes very time consuming and expensive.

It is, therefore, a further more specific object of the present invention to provide a new and improved core shift register circuit and/or logical element which has a minimum of energy dissipation in the link coupling a signal pulse between two cores of the circuit.

Another more specific object of the present invention is to provide a new and novel coupling circuit between adjacent magnetic cores in a core circuit which optimizes the isolation between the input and output of the link between adjacent cores.

Another more specific object of the present invention is to provide new and improved magnetic core circuits which are highly flexible and particularly adapted for use in performing logical functions.

Another feature of the present invention lies in the nature of the way in which the circuit may be adapted for minimizing the number of windings and other components associated with the over-all circuit. In accordance with one form of the invention, the circuit is adapted to be operative so that the shift winding can be used as the winding for transferring signals out and transferring signals in to each of the cores.

It is accordingly a more specific object of the present invention to provide a plurality of magnetic core devices having windings thereon where the windings are so arranged that one winding may be used as a shift winding, an output winding, and as an input winding for the respective cores.

The foregoing objects and features of novelty which characterize the invention, as well as other objects of the present invention, are pointed out with particularity in the claims annexed to and forming a part of the present specification. For a better understanding of the invention, its advantages and specific objects attained with its use, reference should be had to the accompanying drawings and the following descriptive matter in which there is illustrated and described preferred embodiments of the invention.

Figures 1, 2:
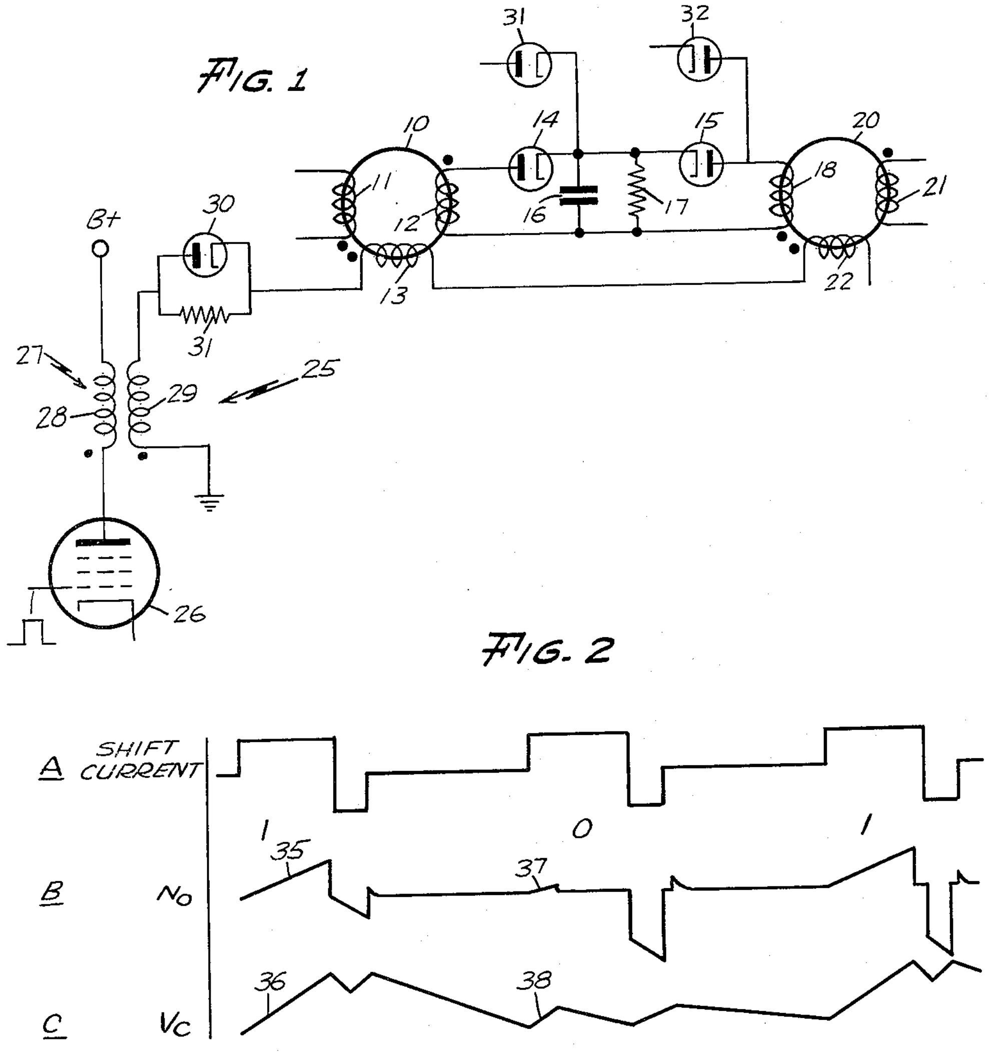
FIGURE 1 illustrates one embodiment of the invention in a shift register configuration.
FIGURE 2 illustrates typical wave forms that may be associated with the apparatus of FIGURE 1.

Referring first to FIGURE 1, there is here shown one form of shift register circuit embodying the principles of the present invention with the schematic details being arranged in a manner similar to that of known shift register circuits. In this circuit, it is desired that a signal which may be read into one core be shifted therefrom into the next core in the series and thence to some other utilization device which may be another core of similar type.

Considering FIGURE 1 more specifically, the numeral 10 identifies a magnetic core element sometimes referred to as a bistable core element having a rectangular hysteresis characteristic. Wound on the core 10 is an input winding 11, an output winding 12, and a shift winding 13. Coupled to the output winding 12 is a coupling link which comprises a pair of diodes 14 and 15 and a parallel connected R-C network which comprises a condenser 16 and a resistor 17.

The coupling network has its output terminals connected to an input winding 18 of a further bistable magnetic core element 20. This core element has, in addition to the input winding 18, an output winding 21, and a shift winding 22.

The shift signal source for the windings 13 and 22 may be by way of a shift signal generating circuit 25. This shift generating circuit 25 comprises a pentode amplifying device 26 having a pulse transformer 27 in the output thereof. The pulse transformer 27 has an input winding 28 and an output winding or secondary winding 29. The secondary winding 29 is connected to ground at one terminal and at the other terminal is connected to a parallel circuit comprising a diode 30 and a resistor 31.

In considering the operation of the circuit of FIGURE 1, it should first be noted that the shift pulse generator circuit 25 produces an output signal which has both positive and negative going sections. The shift current from this shift signal generator 25 is illustrated at A in FIGURE 2. The wave form illustrated is actually an idealized wave form showing square waves for both the positive and negative going sections. With the application of an input trigger pulse to the pentode 26, the pentode will be rendered conducting and will produce an output pulse which is positive on the winding 29. As soon as the pentode 26 is cut-off, the signal in the secondary winding 29 will reverse and will produce the negative going section of the wave illustrated in FIGURE 2A. Three separate shift pulses are illustrated in FIGURE 2A.

It is assumed, with a positive signal applied to the shift windings 13 and 22 of the cores 10 and 20 respectively, that these cores will be shifted to that bistable state which may be defined as the "zero" state. In the absence of other loading factors, the application of a negative pulse to the shift windings 13 and 22 of the cores 10 and 20 respectively will cause the cores 10 and 20 to be shifted to their opposite stable state which may be referred to as the "one" state.

In considering the operation of the register circuit, it is assumed that core 10 has been initially set to the "one" state. When so set, upon the application of the positive going portion of a shift signal, the core will be shifted to its "zero" state and a signal will pass by way of the output winding 12 through the diode 14 to charge the condenser 16. The output voltage from the winding 12 will be as indicated at 35 in FIGURE 2B. Further, the charge on the condenser 16 will be as indicated at 36 in FIGURE 2C.

If there is no interfering signal on the winding 11 on the input of the core 10, the negative portion of the shift current signal will shift the core from the "zero" state back to the "one" state. At the same time that this is taking place, the charge on the condenser 16 will be affecting the loading of the input winding 18 on the core 20. With the application of the positive shift current signal to the winding 22 of the core 20, this core will be shifted from the "one" state to the "zero" state. With the negative portion of the shift current signal applied to the winding 22, the core 20 will be switched back to the "one" state only if a "one" has been shifted out of the core 10. This shifting back by the negative portion of the shift current signal will be effected for the reason that when the condenser 16 is charged positively, as indicated by the charge 36 of FIGURE 2C, there will be substantially no load on the winding 18. Consequently, the negative portion of the shift current signal will be effective to switch the core 20 from its "zero" state back to its "one" state.

In the event that a "one" was not read out of the core 10, the read-out will be a "zero" and the condenser 16 will not be charged. Such a read-out in terms of the output on winding 12 would be as indicated at 37 while the charge resulting therefrom on the condenser 16 would be as indicated at 38. Under these circumstances, the charge on the condenser 16 is insufficient to prevent the diode 15 and condenser 16 from acting as a loading circuit for the winding 18. The loading circuit will be formed by the diode 15 and the network including resistor 17 and condenser 16. The loading will be such as to prevent the negative portion of the shift current signal from setting the core 20 back to its "one" state. Thus when a "zero" has been shifted out of the core 10, the core 20, if having been shifted from a "one" to a "zero," or if already in the "zero" state, will remain in that state even though the negative portion of the shift current signal is applied to the winding 22.

It will be apparent from the foregoing description of the operation of this circuit that the setting of the cores is not dependent upon energy which may be shifted from one core to another but only upon the energy supplied to the core by way of the shift windings. In other words, the signals that are shifted out of the cores are used only to determine the loading on the input winding of the subsequent cores of the series. It will be apparent that this arrangement minimizes the amount of power that must be transferred and further minimizes the amount of power that heretofore has been dissipated in the coupling link between the cores.

It will also be noted that the diodes 14 and 15 are so connected in the circuit that they are in opposition, that is their cathodes are connected together while their anodes are connected in the opposite directions. This connection of the diode circuit causes the circuit to appear as a high impedance and consequently it reduces the coupling between the input winding of one core and the output winding of the preceding core. This isolation serves to minimize the effect of transients and the like in the circuit.

In certain instances, it may be desired to perform logical functions with the apparatus illustrated in FIGURE 1. In terms of basic pulse handling techniques, two basic logical functions most frequently performed are the "OR" function and the "AND" function. The OR function may be produced by the use of diode logic which comprises in the present circuit the addition of a diode 31 poled the same as the diode 14 and coupled to the upper terminal of the condenser 16. Thus, a signal through the diode 31 may charge the condenser 16, or a signal through the diode 14 may charge the condenser 16 to control the loading of the input winding 18 on the core 20.

When it is desired to produce the AND function, an additional diode may be coupled to the upper terminal of the winding 18 in the manner in which the diode 32 is connected. Thus, the circuitry may be so arranged that there must be a load on the input of the diode 32 and a load on the input of the diode 15 to maintain the loading impedance on the core 20 so that it may be set by the negative portion of the shift current signal.

Figure 3:
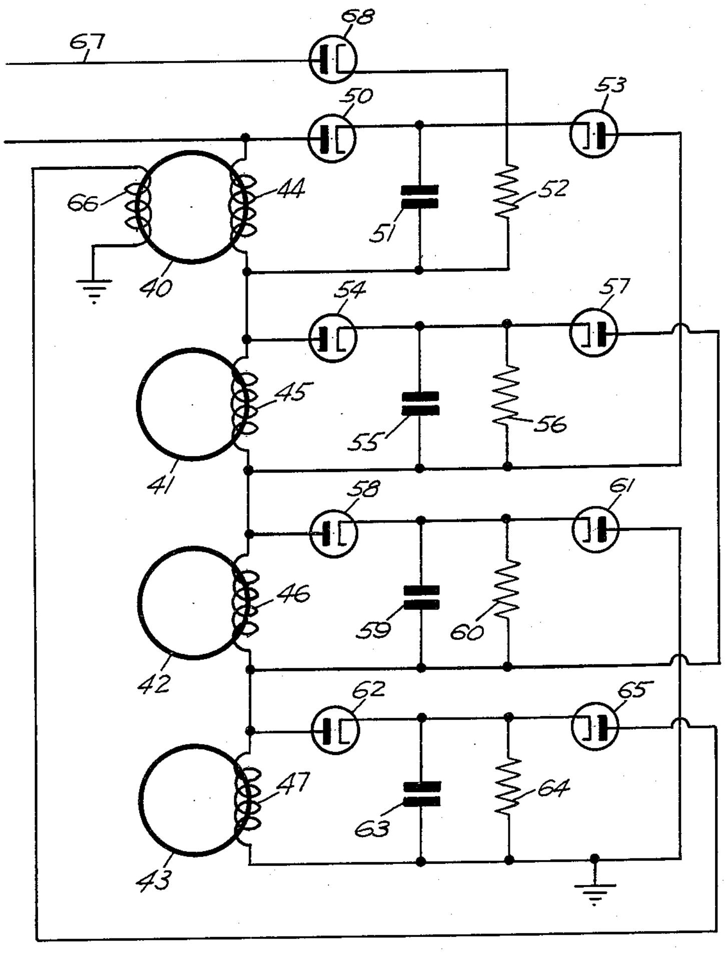
FIGURE 3 illustrates a modified form of the present invention.

Referring now to FIGURE 3, there is here illustrated a modified form of the apparatus wherein a single winding is incorporated on the cores and this single winding is used for both shifting and signal transfer purposes. In this circuit it is assumed that the shift signal input is produced by a circuit such as the shift signal generator circuit 25 of FIGURE 1. In other words, there is a positive going pulse produced in the shift line and this is followed by a negative going pulse. The positive pulse has the effect of shifting any core which is in the "one" state to the "zero" state. The negative pulse will have the effect of tending to shift any core in the "zero" state back to the "one" state.

The circuit of FIGURE 3 includes a plurality of magnetic core elements 40, 41, 42 and 43. Each of the cores 40—43 has a winding wound thereon and these windings are identified by the numerals 44, 45, 46 and 47. Coupled to the winding 44 is a circuit which includes a diode 50, the latter of which is connected in series with a parallel connected condenser 51 and resistor 52. A further diode 53 couples the signals on the R-C network 51—52 to winding 45. Coupled to the upper terminal of the winding 45 is a diode 54, this diode is also connected in series with a parallel connected R-C network which comprises a condenser 55 and a resistor 56. A further diode 57 couples this R-C network to the lower terminal of the winding 46 on core 42. Coupled to the winding 46 at the upper terminal is a further diode 58 which is also in series with a parallel connected R-C network which comprises a condenser 59 and a resistor 60. A further diode 61 couples the network to the lower terminal of the winding 47. A diode 62 is coupled to the upper terminal of the winding 47 and this is likewise connected in series with a parallel connected R-C network comprising a condenser 63 and a resistor 64. Further diode 65 couples this R-C network to a feedback winding 66 which is wound on the core 40.

The input to the network may be by way of a signal input line 67 which is connected to a diode 68. The output of the diode is coupled to the upper terminal of the R-C network 51—52.

As connected in FIGURE 3, the four cores will function as a closed or recirculating register such that any information which may be written into the circuit will be circulated around the circuit.

It is assumed first that each of the cores 40, 41, 42, and 43 are in the "zero" state. When in this state, the application of the shift current signal of the type illustrated in FIGURE 2A will not have any effect upon any of the cores since they are already in the "zero" state. With no signals shifted out of any of the cores, the negative going portion of the shift signal current will not be able to set any of the cores to the "one" state inasmuch as the loading of each of the respective windings will be such that resetting is impossible. Thus, the register will remain in the state where only zeroes are present in the circuit.

It is assumed next that a "one" signal is written into the circuit by way of the input signal line 67 and diode 68. This input signal will be effective to charge the condenser 51 so that upon the application of the next shift pulse, with this charge being on the condenser 51, the winding 45 will not be loaded due to the fact that the R-C network 51—52 is effectively connected in parallel therewith and due to the fact that there is a charge on the condenser 51 which prevents the diode 53 from conducting. This circuit may be traced from the upper terminal of the winding 45 through the R-C network 51—52, and diode 53 back to the lower terminal of the winding 45. This will mean that the negative going portion of the shift current signal will be effective to cause the core 41 to shift to the "one" state. Upon the application of the next shift pulse, the "one" in the core 41 will be read out into the condenser 55 and the resultant charge will accordingly remove the loading from the winding 46 on core 42. Thus, the negative going portion of the next shift pulse will have the effect of causing this core to be set to the "one" state.

A more specific examination of the operation of the circuitry of FIGURE 3 may be considered in the following manner. Assume first, for example, that the core 41 is in the "zero" state of saturation. Since it is in the "zero" state of saturation, the application of the positive portion of the shift signal on the winding 45 tends to switch the core into its saturated "zero" state. Since the core is in the "zero" state, the impedance of the winding 45 will be very low and consequently the voltage drop across the winding 45 will be very low. This will mean that substantially no signal will be applied through the diode 54 to charge the condenser 55. However, when the core 41 has been set to the "one" state and a shift signal is applied to the winding 45 it will cause the core to switch. The initial impedance of the winding 45 will be relatively high so that there will be substantial voltage drop across the winding 45 and this voltage will produce a current flow through the diode 54 which will charge the condenser 55. This same functioning will be occurring in each of the cores of the circuit in accordance with whether or not the cores have a "one" or a "zero" stored therein at the time that the shift signals are applied to the circuit.

It will be apparent that as data is shifted through the cores 40—43 that the output core 43 will produce a signal which will be reflected to the winding 66 on the input core 40. This will permit the information in the register to circulate. It will be apparent that the output diode 65, instead of being connected back to the core 40, may be applied to any other utilization circuit.

The foregoing circuit is also adapted for causing signals to flow in the direction reverse to that described above. In other words, when it is desired that information be moved from core 43 to core 42, this may be achieved by applying a shift current signal which is inverted from that shown in FIGURE 2A. In this case, when the core 43 has a signal shifted therefrom, the signal will pass through the diode 61 and charge the condenser 59. The charge on the condenser 59 will in turn act to control the loading on the winding 46 of the core 42 when the second half or "setting" portion of the shift current signal is applied to the windings.

In addition to incorporating the advantages of the circuitry of FIGURE 1, the present circuitry will obviously be considerably cheaper to manufacture due to the fact that a single winding is required along the cores of the main register. The need for multiple windings is present only when it is desired to have recirculation as is indicated with respect to the core 40 and for entry of serial information.

While, in accordance with the provisions of the statutes there has been illustrated and described the best forms of the invention known, it will be apparent to those skilled in the art that changes may be made in the apparatus as described without departing from the spirit of the invention defined by the claims and that in some cases, certain features of the invention may be used to advantage without a corresponding use of other features.

Having now described the invention, what is claimed as new and novel is:

1. A shift register comprising a plurality of bistable magnetic core elements, each of which has at least one winding thereon, means including a pair of oppositely poled diodes connected in series between one end of an output winding of one core element and one end of an input winding of another core element, and an impedance network being connected at one end to the junction between said diodes and at the other end being directly connected to the other ends of said input and output windings.

2. A shift register comprising a plurality of bistable magnetic core elements, each of which has at least one winding thereon, means including a pair of oppositely poled diodes connected in series between one terminal of the winding of one core element and one terminal of the winding of another core element, a direct connection between the other terminals of said windings, an impedance network including a signal storage condenser connected to the junction between said diodes and to said direct connection, and a shift pulse source coupled to both of said core elements.

3. A shift register comprising a plurality of bistable memory elements, each having windings thereon for effecting the transfer of a signal from one element to the next, a pair of oppositely poled diodes serially connected between the windings of adjacent memory elements and a single shift signal source connected to only one winding on each of said elements, said signal source having an output capable of shifting said memory elements from one bistable state to the other and back again for each signal transfer in the register.

4. A shift register comprising a plurality of bistable memory elements, each having windings thereon for effecting the transfer of a signal from one element to the next, a pair of oppositely poled diodes connected between said windings and a single shift signal source connected to a single winding on each of said elements, said signal source having an output capable of shifting said memory elements from one bistable state to the other and back again for each signal transfer in the register and comprising a constant current pulse generator.

5. A shift register comprising a plurality of bistable memory elements, each having windings thereon for effecting the transfer of a signal from one element to the next, a single shift signal source connected to each of said elements, said signal source having an output capable of shifting said memory elements from one bistable state to the other and back again for each signal transfer in the register, and a coupling circuit between elements of said register, said coupling circuit comprising a pair of oppositely poled diodes connected together and a condenser connected to the junction.

6. A pulse manipulating circuit comprising a plurality of bistable magnetic core memory elements, a winding on each of said elements, a plurality of diodes, each diode having anode and cathode elements, means connecting the anode of each of selected ones of said diodes to a winding on each core element, an impedance network comprising a resistor and a condenser connected in parallel, means connecting said impedance network between the cathode of each diode and the other terminal of the winding to which the associated anode is connected, and means including a further diode having its cathode connected to said impedance network and its anode connected to a winding on another core element.

7. A pulse manipulating circuit comprising a plurality of bistable magnetic core memory elements, a winding on each of said elements, a plurality of diodes, each diode having anode and cathode elements, means connecting the anode of each of selected ones of said diodes to a winding on each core element, an impedance network comprising a resistor and a condenser connected in parallel, means connecting said impedance network between the cathode of each diode and the other terminal of the winding to which the associated anode is connected, means including a further diode having its cathode connected to said impedance network and its anode connected to a winding on another core element, and means connecting all of said windings in series.

8. A pulse manipulating circuit comprising a plurality of bistable magnetic core memory elements, a winding on each of said elements, a plurality of diodes, each diode having anode and cathode elements, means connecting the anode of each of selected ones of said diodes to a winding on each core element, an impedance network comprising a resistor and a condenser connected in parallel, means connecting said impedance network between the cathode of each diode and the other terminals of the windings to which the associated anodes are connected, means including a further diode having its cathode connected to said impedance network and its anode connected to a winding on another core element, and a shift winding on each of said core elements.

9. A shift register circuit comprising first and second bistable core elements, a winding coupled to said first core element, a winding coupled to said second core element, connecting means directly connecting the end of each of said windings together, a signal transfer circuit connected at one end to said connecting means, a pair of oppositely poled diodes connected in series and connecting the other end of each of said windings together, and means connecting said signal transfer means to the junction of said diodes.

10. A shift register circuit comprising first and second bistable core elements, a winding coupled to said first core element, a winding coupled to said second core element, connecting means directly connecting the end of each of said windings together, a signal transfer circuit including a condenser and a resistor connected in parallel and connected at one end to said connecting means, a pair of oppositely poled diodes connected in series and connecting the other end of each of said windings together, and means connecting said signal transfer means to the junction of said diodes.

References Cited in the file of this patent

UNITED STATES PATENTS

| | | |
|---|---|---|
| 2,770,737 | Ramey | Nov. 13, 1956 |
| 2,825,890 | Ridler | Mar. 4, 1958 |
| 2,873,438 | Bieganski et al. | Feb. 10, 1959 |

FOREIGN PATENTS

| | | |
|---|---|---|
| 730,165 | Great Britain | May 18, 1955 |